United States Patent [19]

Pierotti

[11] Patent Number: 5,260,046
[45] Date of Patent: Nov. 9, 1993

[54] METHOD FOR REMOVING EPOXIDES FROM GASEOUS EFFLUENTS

[76] Inventor: David J. Pierotti, 805 Suffolk Street, Cambria, Calif. 93428

[21] Appl. No.: 582,760

[22] Filed: Sep. 14, 1990

[51] Int. Cl.$^5$ .............................................. B01D 53/34
[52] U.S. Cl. .................. 423/245.1; 568/867; 95/50
[58] Field of Search .............. 423/245.1, DIG. 20; 55/16; 502/159, 4; 568/867, 907

[56] References Cited

U.S. PATENT DOCUMENTS

| | | | |
|---|---|---|---|
| 3,091,647 | 5/1963 | Hamilton et al. | 568/867 |
| 3,851,043 | 11/1974 | Gunther | 423/245.1 |
| 4,165,440 | 8/1979 | Kim | 568/867 |
| 4,409,403 | 10/1983 | Vaughan | 568/678 |
| 4,504,685 | 3/1985 | Vaughan | 568/867 |
| 4,612,019 | 9/1986 | Langhorst | 55/16 |
| 4,828,810 | 5/1989 | Kruse et al. | 423/245.1 |
| 4,861,923 | 8/1989 | Olah | 568/899 |
| 5,069,686 | 12/1991 | Baker et al. | 55/71 |

OTHER PUBLICATIONS

Othmer, D. F., ed. "Fluidization", Reinhold–Chapman: New York, (1956), p. 107.

*Primary Examiner*—Wayne A. Langel
*Assistant Examiner*—Peter T. Di Mauro
*Attorney, Agent, or Firm*—Warren A. Kaplan

[57] ABSTRACT

A method and apparatus for removal of gaseous epoxides from effluent gas streams is described. The method comprises contacting a gaseous sample suspected of containing gaseous epoxides with a polymer barrier. The polymer barrier is comprised of a superactidic perfluorinated alyl sulfonic acid polymer that is capable of converting a gaseous epoxides to gaseous non-epoxide products. Specifically, the method of capable of removing ethylene oxide and propylene oxide from effluent gas streams with greater than 90% efficiency.

20 Claims, 1 Drawing Sheet

METHOD FOR REMOVING EPOXIDES FROM GASEOUS EFFLUENTS

BACKGROUND OF THE INVENTION

Ethylene oxide is widely used sterilize medical products and fumigate foodstuffs. Although propylene oxide has been suggested as a possible alternative to ethylene oxide, ethylene oxide is still currently the only available method for effectively sterilizing materials that are sensitive to heat, moisture, or radiation.

Approximately 60-70% of industrially sterilized medical devices use ethylene oxide as a sterilant. An estimated 10-12 billion items per year are sterilized with ethylene oxide by manufacturers of medical products. An additional 200-300 million items per year are sterilized with ethylene oxide by hospitals, clinics, physicians, dentists, veterinarians, and research institutions. Almost all of the 18 million surgical procedures performed annually in the United States require the use of items sterilized with ethylene oxide, and many common surgical procedures could not be safely undertaken without ethylene oxide-sterilized equipment.

Unfortunately, ethylene oxide is a suspected human carcinogen with a relatively long atmospheric lifetime of greater than about 100 days. Its background concentration in marine air of the Northern Hemisphere is about $20-50 \times 10^{-12}$ liter per liter of air (20-50 parts per trillion by volume—pptv). Concentrations in cities can reach hundreds of pptv. Concentrations up to $3 \times 10^{-6}$ (parts per million—ppmv) have been measured near point sources. Moreover, fugitive emissions from manufacturing processes which require large amounts of ethylene oxide, for example the manufacture of ethylene glycol, also release large amounts of this gas into the atmosphere. Most gaseous ethylene oxide used in sterilization and fumigation processes is directly vented to the atmosphere at the present time. Furthermore, prior to the time sterilized items are packaged, they are allowed to sit in "aerators" where residual ethylene oxide diffuses away or outgases from the sterilized items. These sources of gaseous ethylene oxide are difficult to control.

There are four existing control technologies for ethylene oxide emissions: thermal oxidation, catalytic oxidation, acid-catalyzed scrubbing, both with and without solid reactant beds, and condensation/reclamation systems. Although there is a need for a method to remove gaseous ethylene oxide from exhaust gases of sterilizing chambers and other sources, existing methods may not be suitable under certain circumstances. Catalytic oxidation and acid catalyzed scrubbing systems are commercially available for facilities emitting large amounts of ethylene oxide. Ethylene oxide reacts rapidly in acid solution to form ethylene glycol and this is one of the main techniques used to scrub ethylene oxide from exhaust gas streams. However, acid scrubbers and catalytic oxidation units are very expensive. Their average cost is more than $100,000 and they do not scale down easily. The least expensive units are still approximately $50,000. Therefore, it is still extremely expensive for small facilities using ethylene oxide to install scrubbers. These facilities may have to eliminate using ethylene oxide entirely when emission controls become mandatory. Thermal oxidation and condensation/reclamation systems also do not scale down easily for smaller operations.

SUMMARY OF THE INVENTION

A process for removing gaseous epoxides from a gaseous mixture is described. A gas stream containing gaseous epoxides is contacted with a selectively permeable and superacidic, ion-containing polymer barrier. The barrier preferably comprises a perhalocarbon sulfonic acid polymer containing a repeating unit represented by the general formula:

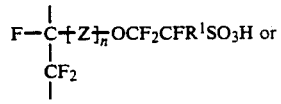

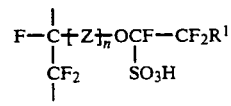

or mixtures thereof wherein n is 0, 1 or 2, $R^1$ is fluorine (—F) or perfluoroalkyl of 1 to 10 carbons, Z is $(-O-CF_2-CF_2-)_m$; $-OCF_2CFY-$ or $-OCFYCF_2-$, where m is 1 to 9, and Y is —F or trifluoromethyl.

The perhalocarbon sulfonic acid barrier is permeable to many cations and polar compounds including gaseous epoxides such as ethylene oxide and propylene oxide, but is impermeable to anions and non polar species. The perhalocarbon sulfonic acid polymer acts as an extremely strong acid, catalyzing the conversion of gaseous epoxide at ambient temperature and pressure to less harmful non-epoxide products.

The method of the invention comprises contacting a gas stream suspected of containing gaseous epoxides with a superacidic ionomeric barrier comprising a perhalocarbon sulfonic acid polymer, under conditions sufficient to convert gaseous epoxides within the sample to non epoxide products. Epoxide-free gas is then separated from the vicinity of the barrier.

In a method of the invention, a gas stream suspected of containing gaseous epoxide is contacted with a first side of a permeable polymer barrier. The gas stream is allowed to permeate the polymer barrier in order for gaseous epoxides to be hydrolyzed on or in the barrier. In one embodiment of the method, the sample suspected of containing gaseous epoxide is applied to the first side of the membrane under pressure to force the permeable components of the gaseous sample across the barrier. Alternatively, a vacuum can be applied to a second side of the polymer barrier to pull the permeable components of the gaseous sample across the barrier.

In particularly preferred embodiments, epoxide-free purge gas is contacted with a second side of the polymer barrier. By providing continuous flow of epoxide free purge gas on the side of the barrier opposite from the gas sample, permeation of gaseous epoxide and its hydrolysis to non-epoxide products on or in the barrier can be performed continuously because the purge gas removes epoxides and their hydrolyzed products from the vicinity of the barrier.

DETAILED DESCRIPTION OF THE INVENTION

Figure 1:
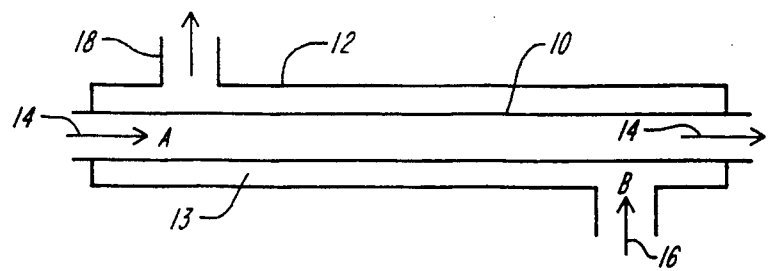
FIG. 1 is a schematic illustration of one principle of continuous flow removal of gaseous epoxides from an effluent gas sample.

A process for removing gaseous epoxides from a gaseous mixture is described. The process involves contacting a gas stream containing a gaseous epoxide with a selectively permeable, ion containing polymer barrier to convert such epoxides to non-epoxides. These ion-containing polymers are referred to as "ionomers". Their concentration of ion-containing groups is too low for water solubility so that the ionomers useful in the methods of this invention are solid polymers. The term "ionomer" includes a variety of polymers containing pendant ionic (carboxylic, sulfonic) groups on a polyolefin backbone. The term "ionomer" is also meant to encompass many different polymers with the capability of forming intermolecular ionic bonds, including ethylene methacrylic acid copolymers and styrene acrylic acid copolymers.

The solid ionomers of the invention behave as superacids. The term "superacid" is defined herein as a polymer barrier having Hammett $H_o$ acidity function values of at least $-11$. The acidic character of the solid polymers of the invention is at least comparable to 100% sulfuric acid ($H_2SO_4$: $H_o = 11$).

The most preferred ionomers are the superacidic, selectively permeable perhalocarbon sulfonic acid polymers. The halogen moiety of the preferred ionomers can be any of fluorine, chlorine or bromine, although fluorine is particularly preferred. The term "perfluorocarbon sulfonic acid polymer" is therefore meant to include a wide variety of solid perfluorinated alkyl sulfonic acids, e.g., the free acid forms of polymers such as trifluoroethylene sulfonic acid polymers, tetrafluoroethylene-trifluoroethylenesulfonic acid copolymers or the activated free acidic forms of copolymers of perfluoroalkenesulfonic acids and perfluorovinyl ethers.

The preferred perhalocarbon sulfonic acid polymers of the invention can preferably be formed by copolymerizing a halogenated olefin such as tetrafluoroethylene, trifluoroethylene, perfluorovinyl ether, vinylidene fluoride or vinyl fluoride with a perfluorovinyl ether monomer. The perfluorinated polymers of the invention may have the pendant sulfonic acid attached either directly to the main polymer chain or to perfluorocarbon side chains which are attached to the main polymer chain. Either or both of the main polymer chain and the side chain may contain oxygen atom linkages as in the commercially available perfluorinated Nafion®-type polymers manufactured by Dow Chemical Company.

The polymer preferably has an equivalent weight (i.e. The weight of polymer per sulfonic acid group in grams) ranging from about 600 to about 2500. Most preferably, the equivalent weight of the polymer is less than about 1200. The average molecular weight of the polymers is not accurately known but such polymers typically have a molecular weight of between 1000 and 500,000 daltons.

The perfluorocarbon sulfonic acid barrier is permeable to many cations and polar compounds, including water and gaseous epoxides such as ethylene oxide and propylene oxide. The polymer barrier is impermeable to anions and non-polar species, such as nitrogen gas. Cation size and ionic properties determine mobility through the polymer barrier.

The feature that makes perfluorocarbon polymer barriers especially useful in the present invention is their superacidity. The polymer acts as an extremely strong acid (a superacid), catalyzing the hydrolysis of the epoxide to non epoxide products. Since the sulfonic acid group is attached to a highly electron withdrawing perfluoroalkyl backbone, a relatively high polarization of the O—H bond results. $H_o$ values on the Hammett scale are at least about $-11$ and are preferably at least about $-25$. See Olah. U.S. Pat. No. 4,861,923 (Aug. 29, 1989). Perfluorinated polymers of the invention have sulfonic acid groups in the amount of about 0.01 to about 5 meguivalents/gram polymer.

A preferred polymer barrier can consist of a perfluorocarbon copolymer of tetrafluoroethylene and a perfluorovinyl ether having the repeating unit represented by the general formula:

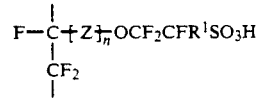

or

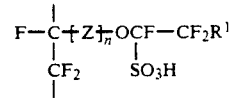

where n is 0, 1, or 2: $R^1$ is fluorine (—F) or perfluoroalkyl of 1 to 10 carbon atoms, Z is (—O—$CF_2$—$(CF_2)_m$, —$OCF_2$—CFY—or—$OCFYCF_2$—, where m is 1 to 9, and Y is—F or trifluoroemethyl.

Preferably, the polymer contains a repeating unit represented by the general formula:

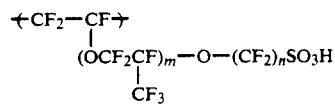

wherein m is 0 or 1 and n is 2 to 5.

Perfluorinated polymers preferred in the present invention and their preparation are described in U.S. Pat. Nos. 4,329,434 (Kimoto et al.), 4,303,551 (Vaughan), 4,409,403 (Vaughan), 3,882,093 (Cavanaugh) the disclosures of which are incorporated herein by reference.

The process of the invention is specifically designed to destroy gaseous epoxides in an effluent gas. The term "effluent gas" refers to any gaseous sample suspected of containing gaseous epoxides. "Epoxides" are defined herein as gaseous organic compounds containing at least the three membered epoxide (oxirane) ring:

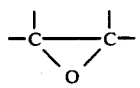

Gaseous compounds containing the epoxide ring include, but are not limited to, ethylene oxide and propylene oxide. Other epoxides can be destroyed using the process of the invention provided that the epoxides are volatile and exist in the gaseous phase at atmospheric temperatures and pressures.

The term "barrier" is meant to refer to a wide variety of perfluorocarbon sulfonic acid objects having finite thickness that are capable of presenting an obstacle to the free flow of a gas. Examples of perfluorocarbon sulfonic acid barriers useful in the invention include sheets, membranes, films, tubes, hollow fibers and the like of finite thickness that are composed entirely of perfluorinated alkyl sulfonic acid polymer. The barrier can also be a composite comprising a perfluorinated alkyl sulfonic acid barrier laminated to, or impregnated on or into, a support layer. Preferably, the barrier in these formulations is a flat sheet, membrane or film. The support layer can be itself a porous membrane or a woven, knitted or nonwoven fabric. See, Oogai et al., U.S. Pat. No. 4,537,910 and Vaughan, U.S. Pat. No. 4,303,551, the disclosures of which are incorporated by reference herein.

The ionomeric polymer barrier is porous and the methods of the invention rely on the fact that these polymers are selectively permeable to gaseous epoxides. The terms "permeate", "permeable" or "selectively permeable" refer to the fact that water vapor, gaseous epoxides and other polar compounds (lower alcohols up to hexanol, esters, amines and some ketones) can penetrate and flow into a polymer barrier having finite thickness, while other non-polar compounds, including atmospheric gases such as oxygen, nitrogen and argon cannot pass through the barrier. The gaseous products that are formed after reaction of epoxides with the polymer barrier are believed to be permeable to the barrier as well.

In order to undergo conversion to non-epoxide products, gaseous epoxides must come in contact with the superacidic sulfonic acid groups of the polymer barrier. These sulfonic acid groups can be located on the surface, or in the interstices, of the polymer barrier. Therefore the methods of this invention are designed to remove gaseous epoxides from gas streams by contacting the gas stream with either the surface of a polymer barrier and/or the internal matrix of a polymer barrier. The term "within" or "in" is meant to encompass both these possibilities.

The sulfonic acid group catalyses the hydrolysis of gaseous epoxides to a variety of non epoxide products. Since the reactions are catalytic, the barrier itself is regenerable and the sulfonic acid groups are not lost or otherwise made unavailable with each reaction. The most likely products of this acid catalyzed hydrolysis are the corresponding glycols such as ethylene glycol and propylene glycol in the case of ethylene oxide and propylene oxide, respectively.

Conditions under which gaseous epoxides in an effluent gas stream can be converted to non epoxide products will vary depending on the particular application and can easily be optimized for various applications by those of ordinary skill in the art. Removal of gaseous epoxides according to the preferred methods of this invention can, however, be performed at room temperature (23°-25° C.). Higher operating temperatures may facilitate transfer of minimally volatile non epoxide products (e.g., propylene glycol) from the vicinity of the polymer barrier. The methods of this invention can be performed at elevated pressures, although subambient pressures can also be utilized, as discussed below.

Once the gaseous epoxide has come in contact with the sulfonic acid groups of the polymer barrier, the product(s) resulting from this contact can be transferred from the vicinity of the barrier. There are a variety of methods, all defined by the term "continuous flow", that can be used to assist removal of epoxides in a continuous manner. "Continuous flow" as defined herein, involves passing an effluent gas stream along one side of a barrier and causing the gaseous epoxides to be continuously removed as the effluent gas stream flows along the barrier.

In one embodiment, referred to as "pressure flow", the gas sample suspected of containing gaseous epoxides is provided to the barrier under pressure and it is believed that the pressure differential across the polymer barrier is sufficient to drive the gaseous epoxides and other permeable substances, such as the hydrolysis reaction products, across the polymer barrier and away from the vicinity thereof. Modest pressures (30 psi -100 psi) may be advantageous in this regard.

In another embodiment, referred to as "vacuum flow", gaseous effluent suspected of containing epoxides is placed in contact with one side of a polymer barrier and a vacuum force is applied to the other side of the polymer barrier. The vacuum provides a driving force through which the permeable components of the gaseous effluent can continuously move into the polymer barrier. Conversion of gaseous epoxides to non epoxide products occurs within the barrier. The non epoxide, permeable products exit the barrier and are swept away from the vicinity of the barrier by the vacuum.

Removal of the epoxide free gas can be accomplished most preferably by purge flow methods. The term "purge flow" refers to procedures whereby effluent gas suspected of containing gaseous epoxides are continuously contacted with one side of a perfluorinated polymer barrier, as described above, and epoxide-free purge gas is contacted with the other side of the polymer barrier. The purge gas serves to sweep the products of epoxide hydrolysis away from the barrier and to thereby enhance removal of epoxides from the gas stream. Effluent gas and purge gas can flow in substantially different directions, or in the same direction. Alternatively, purge gas can flow in a direction substantially perpendicular to effluent gas flow. The direction of purge gas flow is not critical to the functioning of the purge flow methods of the invention.

Purge gas flow methods can be combined with pressure flow and/or vacuum flow in a variety of advantageous ways. For example, the purge gas can be applied to the side of the polymer barrier opposite to the effluent gas sample by either flowing the purge gas under pressure or by flowing the purge gas using a vacuum. This latter method may be particularly advantageous in continuous flow systems because, in addition to supplying the force needed to flow the purge gas across the surface of the barrier, the vacuum will provide the force through which the permeable components of the gaseous effluent can move into the polymer barrier, as described above.

In particularly preferred continuous flow methods, a tube or hollow fiber barrier is desirable because it provides both a large surface area to volume ratio and provides a structural basis for passing the gas stream containing gaseous epoxides along and in contact with one side of the barrier. In one embodiment of the purge flow method, a gas stream containing gaseous epoxides such as ethylene oxide and/or propylene oxide can be passed through a single tube composed of the perfluorocarbon sulfonic acid polymer. In other embodiments, the gas stream can be passed through a plurality of bundled, hollow fiber tubes. The number of tubes can vary according to the specific application and can be determined by one of ordinary skill in the art.

Figure 2:
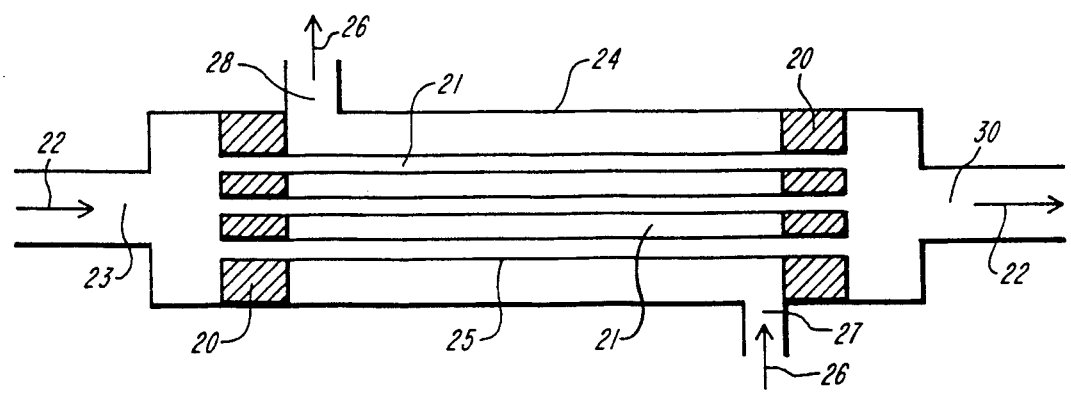
FIG. 2 is a schematic illustration of a preferred method and apparatus for purge flow removal of gaseous epoxide from an effluent gas sample.

A bundle of several hundred individual fibers can be used in, for example, the apparatus of FIG. 2. See Toyomoto et al., U.S. Pat. No. 4,844,719 (Jul. 4, 1990) incorporated herein by reference. A dry, clean, purge gas such as air or nitrogen, essentially free of gaseous epoxides and impermeable in the polymer barrier is passed over the fibers. Other gases can be used for the purge gas provided that they are free of gaseous epoxides and substantially incapable of permeating the polymer barrier.

As the gaseous epoxides permeate the polymer barrier, the sulfonic acid groups contained in the polymer catalyze the conversion (e.g. hydrolysis) of gaseous epoxides such as ethylene oxide and propylene oxide to corresponding non epoxide products (e.g. glycols). The conversion products still are of a size and charge that permits them to move within and through the barrier. The epoxide free products exit and are swept away from the other side of the barrier by the purge gas and can be collected for appropriate disposal, if desired. The countercurrent flow procedure can be operated continuously to remove ethylene oxide and/or propylene oxide from a gas stream such as from a sterilizing chamber, or other source.

Without wishing to be bound by any theory, it is believed that the driving force for propelling the gaseous epoxides across the polymer barrier during purge flow methods comprises one or both of two mechanisms. Because the purge gas is substantially free of gaseous epoxides, there is an epoxide concentration gradient built up between the inflowing effluent gas stream and purge gas stream. The epoxide concentration gradient may provide a mechanism for forcing the gaseous epoxides across the barrier. As gaseous epoxides are converted within the barrier to other products, a concentration gradient is built up as well between the products within the barrier and in the purge gas. Another mechanism which may operate concurrently is the fact that there will be a difference in the partial pressure of water vapor across the polymer barrier. An effluent gas stream, especially when taken from near a sterilizer unit or under ambient atmospheric conditions, will almost always contain more water vapor than the dried purge gas. Because the perfluorinated polymer is also selectively permeable to water, any water vapor contained in a humidified effluent gas stream will be higher on the inflowing side than on the purge gas side. The difference in partial pressure of water vapor between both sides of a polymer barrier will also tend to drive gases across the polymer barrier. In addition, a vacuum applied to the purge gas side of the barrier or gas pressure applied to the effluent gas side of the barrier may also facilitate gas transfer during countercurrent methods, as described above.

Referring to FIG. 1, one type of purge flow method is schematically illustrated. A perfluorinated alkyl sulfonic acid polymer tube 10 (shown in cross-section) is positioned within a containment tube 12 of substantially larger inside diameter. The space between the outside of the polymer tube 10 and the inside of the containment tube 12 defines an annular purge channel 13 through which purge gas may be circulated. Purge gas is introduced into this channel 13 at one end by way of inlet port 16 and exits the channel 13 at the other end by way of exit port 18. An effluent gas stream 14 suspected of containing ethylene oxide, for example, is caused to flow in one direction (arrow A) through the inside of the polymer tube 10, and a flow of purge gas entering inlet port 16 is passed in the opposite direction (arrow B) through the larger tube 12 and around the outside of the polymer tube 10. The gas stream exiting tube 10 has a much lower content of gaseous epoxide than the initial effluent gas. Purge gas exiting at exit port 18 may be discarded or reused. The purge gas can be any gas that is substantially free of gaseous epoxides. Purge gases can include air and inert gases such as nitrogen, argon, and helium.

The concentration of gaseous epoxide in the gas stream 14 exiting from the polymer tube 1 and the concentration of gaseous epoxide in the purge gas stream is measured. The concentration of gaseous epoxide in the gas stream exiting from the polymer tube is invariably less than that of the original inflowing effluent gas. This is an indication that epoxides are at least entering the barrier. Ethylene oxide, in particular is extremely volatile (see Example 1). It is unlikely that it will accumulate within the barrier. Measuring gaseous epoxides in the exiting purge gas stream 18 will test whether the lack of epoxide in the exiting effluent gas 14 is due to bulk transfer of epoxide across the polymer barrier into the exiting countercurrent gas stream. When the concentration of gaseous epoxide in the exiting purge gas stream 18 is about ninety percent (90%) lower than the effluent gas 14, this is confirmation that substantially all of the ethylene oxide has been removed from the inflowing gas stream and that it is, in fact, not reaching the other side of the polymer barrier.

The apparatus for removing gaseous epoxides from a gas stream can be scaled for any size facility simply by varying the number of tubes or hollow fibers used. A small sterilization chamber such as those used by physicians or veterinarians emitting on the order to 10 to 100 ppmv can be scrubbed of ethylene oxide or propylene oxide by an apparatus containing a single tube or hollow fiber (about 2 meters long and about 100 $\mu$m thick) of the fluorinated alkyl sulfonic acid barrier. Emissions from a large facility can be scrubbed of ethylene oxide and/or propylene oxide by increasing the number of tubes or hollow fibers employed in the apparatus. In order to maintain a large surface to volume ratio while accommodating high gas flow rates, the tubes or hollow fibers can be bundled together in a single housing containing a flow of the purge gas. This is illustrated in FIG. 2, which is a schematic diagram of an apparatus and method for removing gaseous epoxides from gaseous effluents using hollow fibers formed of permeable perfluorinated polymer barriers.

Perfluorinated polymer barriers of the invention can be formed and molded to produce a membrane in the form of hollow fibers 20. The thickness of the membrane should be as small as possible to improve permeation characteristics, although the smallest possible thickness is necessarily fixed by mechanical and manufacturing constraints. Fibers having a wall thickness on the order of 0.1 to 100 $\mu$m (preferably 40$\mu$m to 100$\mu$m) can be obtained.

Sample effluent gas 22 is introduced via gas inlet 23 into a module 24 containing the bundled fibers 21 separated from each other by a plurality of dividers or panels 20. The module 24 can be a metal and most preferably is stainless steel or other non corrosive metal. Alternately, the module 24 can be fabricated of an inert polymer such as polytetrafluoroethylene (PTFE Teflon ®).

Purge gas 26 is introduced into the module 24 via purge inlet port 27 and continually sweeps over the exteriors 25 of the bundled fibers 20 as it moves towards purge outlet port 28. The purge gas can be nitrogen or air. Although air can be used for this procedure, nitrogen can conveniently be administered as purge gas from a liquid nitrogen tank. The liquid nitrogen tank is allowed to bleed off gaseous nitrogen and this gaseous nitrogen can be used as purge gas. Nitrogen produced in this way is particularly preferred because hydrocarbon impurities are frozen out of the gas and the resulting purge gas is substantially free of contaminants. If the purge gas 26 is fed under slight pressure, the purge gas 26 will exit the module through an exit port 28. Alternatively, the purge gas 26 can be introduced into the module at atmospheric or subambient pressures. In this situation, a source of vacuum is attached to port 28, the term "vacuum" meaning a pressure lower than the atmospheric pressure. The vacuum at port 28 serves to pull permeable gases contained in the effluent gas 22 through the fibers 20 and pull the purge gas 26 across the exteriors 25 of the fibers 20. Effluent gases that are not capable of permeating the fiber barriers exit the module 24 at port 30. In atmospheric samples, these gases will be primarily oxygen, nitrogen and inert gases.

Gaseous epoxides in the effluent gas stream 22 are converted by the polymer barrier 20 to permeable non epoxide products. As the non epoxide products (e.g. ethylene glycol) are formed in the barrier, they diffuse through the barrier and are swept away from the surface of the barrier 25 by the purge gas 26.

Flow rates of both effluent gas and purge gas can vary depending upon the dimensions of the polymer barrier and the module. For individual polymer barriers approximately 2 meters long, 100 microns in thickness, and 600 $\mu$m inside diameter, the effluent gas flow rate is within the range of about 100 to about 200 ml per minute per tube. Most preferably, the effluent flow rate is about 100 ml per minute per tube. The purge gas flow rates are correspondingly higher, ranging from about 200 to about 500 ml per minute per tube. Preferably, the purge gas flow rate is approximately 200 ml per minute per tube. With a bundled configuration, the total flow rates can correspondingly increase. For example, with a module 24 containing at total of ten bundled fibers 20, the effluent flow rate can approach 2 liters per minute.

Figure 3:
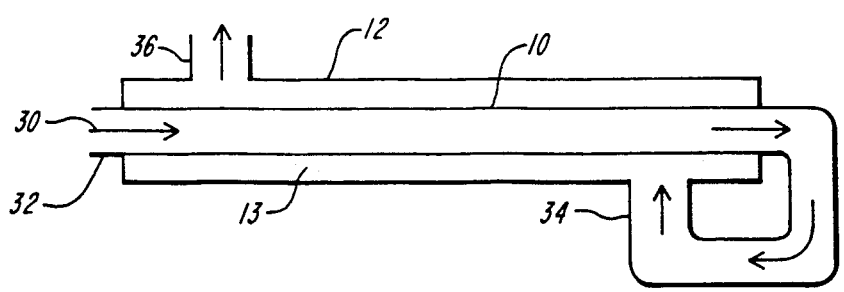
FIG. 3 is a schematic illustration of the principle of recirculating flow removal of gaseous epoxides from an effluent gas sample.

In yet another embodiment of continuous flow methods, referred to as "recirculating flow", the effluent gas stream exiting from a polymer barrier within a module 24 or containment tube 12 is diverted directly back into the module 24 or containment tube 12. FIG. 3 illustrates this embodiment which, in effect, uses the epoxide-free effluent gas stream as a purge gas. Although FIG. 3 illustrates a recirculating flow method using a single, tubular ionomeric barrier, it is understood that persons of ordinary skill in the art can adopt the method for use with other types of barriers. Sample effluent gas 30 is introduced via gas inlet 32 into a containment tube 12 containing the polymer barrier 10, in a manner identical to that previous FIGS. 1. Effluent gases exiting the containment tube are fed directly back into a purge inlet port 34. This embodiment is particularly advantageous when it is important to reduce the levels of ethylene oxide down to extremely low concentrations. As the effluent gases containing gaseous epoxides make a first pass through the barrier, the gaseous epoxides permeate the barrier 10 and are converted to non epoxide products at greater than about 90% efficiency, as described above. Therefore, the effluent gases that exit from the module or containment tube are essentially epoxide free and can be circulated back into the annular purge channel 13 of the containment tube 12 as purge gas. The effluent gas re enters the containment tube 12 and now contacts the exterior surfaces of the polymer barrier 10. Non permeable gases in the effluent gas will exit the containment tube 12 at exit port 36 but any epoxides remaining in the effluent flow will permeate the barrier 10 for a second time and be converted to non-epoxide products. Each successive pass through a recirculating loop will decrease the concentration of gaseous epoxides. It is believed that greater than 99% of gaseous epoxides can be removed from a given gaseous effluent using this recirculating purge methodology.

The selective permeability and superacidity of these perhalocarbon polymer barriers also provides the basis for a simple breathing mask, constructed by impregnating at least a portion of a barrier of perhalocarbon sulfonic acid polymer resin with a porous backing that is permeable to air. The composite barrier created is permeable to air through the porous backing and the polymer resin barrier is permeable to water and other polar compounds, including ethylene oxide and propylene oxide. The mask is worn over the lower part of the face, covering the nose and mouth, so that when the wearer breathes, air passes through the porous backing. When the wearer inhales, it is believed that a partial vacuum is formed on the inner surface of the mask, thus providing a form of vacuum flow. Air is drawn through the porous backing and any ethylene oxide or propylene oxide contained in the air will be drawn through the polymer barrier and hydrolyzed to the corresponding glycol by the sulfonic acid groups in the barrier. While the perfluorocarbon sulfonic acid polymers are extremely strong acids, the sulfonic acid groups in the polymer are essentially immobile and immersed in a fluorocarbon matrix so the fluorinated alkyl sulfonic acid membranes can contact human skin without causing irritation.

The following examples illustrate the process for removing ethylene oxide and propylene oxide from gaseous mixtures, but are not intended to limit the scope of this invention in any way.

EXAMPLE 1

Removal of Ethylene Oxide

An apparatus consisting of a 2 meter long perfluorinated alkyl sulfonic acid polymer tube (0.625 mm internal diameter by 0.875 mm outside diameter) inside a stainless steel tube (3.2 mm outside diameter) was constructed. A gas stream containing 100 parts per million (ppm) of ethylene oxide was passed through at about 100 ml/minute along the inside of the polymer tube, and a countercurrent flow of nitrogen gas (about 200 ml/min) was passed through the stainless steel tube and around the outside of the polymer tube in the opposite direction. The concentration of ethylene oxide in the gas stream exiting from the polymer tube and in the countercurrent nitrogen gas stream was measured by directing the gas stream into the sample loop of a gas chromatograph. Specifically, a gas chromatoqraph, having a 25-30 meter capillary column (0.25 mm) filled with 100% methyl silicone was used. The column was operated at 30° C. using helium as carrier gas. The results are shown in Table 1.

Ethylene Oxide Concentration (ppmv)

| | Effluent Gas | | |
|---|---|---|---|
| | Inflow | Outflow$^a$ | Countercurrent Purge Gas |
| Exp. #1 | 102 | 1.1, 0.1 | — |
| Exp. #2 | 102 | 2.0, 0.03 | 0.08 |
| Exp. #3 | 102 | 4.1, 1.8, 0.15, 1.1 | <0.01 |

$^a$Numbers separated by commas refer to samples taken from the outflow every 15 minutes after introduction of the effluent gas into the module.

It can be seen from the data in Table 1 that more than 99% of the ethylene oxide has been removed from the gas stream, and that the ethylene oxide does not appear in the countercurrent flow of nitrogen gas. Ethylene oxide is extremely volatile (boiling point: 10° C. or about 50° F.) so that it is unlikely that unreacted ethylene oxide will accumulate within the interstices of the barrier. A fourth experiment was performed using 102 ppmv ethylene oxide but the outflow gas was collected cryogenically with a liquid nitrogen cold trap. The trap was reheated the next day and ethylene oxide analyzed by gas chromatography, as above. Successive analyses using this cryogenic technique showed 0.05, 0.95, 0.32 and 0.33 ppmv ethylene oxide in the outflow gas. These results agree quite well with the other experiments, indicating better than 99% removal of ethylene oxide.

EXAMPLE 2

Removal of Propylene Oxide

In the same apparatus as used in Example 1, a gas stream containing 10 parts per million (ppm) of propylene oxide was passed through the inside of the polymer tube (about 100 ml/min), and a countercurrent flow of nitrogen gas (about 200 ml/min) was passed through the stainless steel tube and around the outside of the polymer tube. The concentration of propylene oxide in the gas stream exiting from the polymer tube and in the countercurrent nitrogen gas stream was measured using gas chromatography, as described above. The results are shown in Table 2.

Propylene Oxide Concentration (ppmv)

| Effluent Gas | | |
|---|---|---|
| Inflow | Outflow$^a$ | Countercurrent Purge Gas$^a$ |
| 10.2 | 0.8, 1.0, 1.1 | 0.05, 0.3, 0.6 |

$^a$Numbers separated by commas refer to samples taken every 15 minutes after introduction of the effluent gas into the module.

It can be seen from the date in Table 2 that removed from the gas stream, and that most of the propylene oxide has been destroyed, since less than 6% of the propylene oxide appears in the countercurrent flow of nitrogen gas.

While the invention has been disclosed herein in connection with certain embodiments and detailed descriptions, it will be clear to one of ordinary skill in the art that modifications or variations of such details can be made without deviating from the scope of this invention, and such modifications or variations as well as equivalents are considered to be within the scope of the claims hereinbelow.

I claim:

1. A method for removing gaseous epoxides from a gas sample comprising:

contacting a gas sample containing gaseous epoxides with a selectively permeable barrier comprising a superacidic ionomer; and converting the gaseous epoxides within the barrier to non-epoxide products, said barrier being selectively permeable to said gaseous epoxides and non-epoxide products and impermeable to non-polar gases.

2. The method of claim 1, wherein the gas sample is contacted with an ionomer that is a perhalocarbon sulfonic acid polymer.

3. The method of claim 2, wherein the gas sample is contacted with a perfluorinated alkyl sulfonic acid polymer that contains a repeating unit represented by the general formula selected from the group consisting of

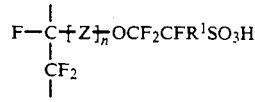

and

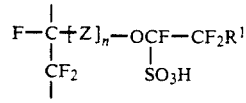

and mixtures thereof wherein n is 0, 1 or 2, $R^1$ is —F or perfluoroalkyl of 1 to 10 carbons, Z is (—O—CF$_2$—CF$_2$—)$_m$; —OCF$_2$CFY—or—OCFYCF$_2$—, where m is 1 to 9, and Y is —F or trifluoromethyl.

4. The method of claim 2, wherein the perhalocarbon alkyl sulfonic acid polymer contains a repeating unit represented by

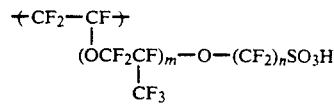

wherein m is 0 or 1 and n is 2 to 5.

5. The method of claim 4, wherein the gas sample contacting the polymer contains an epoxide selected from the group consisting of ethylene oxide and propylene oxide.

6. A method of claim 1, wherein the ionomer has an $H_o$ value of between about −11 and −25.

7. The method of claim 1, wherein the step of contacting the gas with the barrier comprises contacting for no more than about 15 minutes.

8. A method for removing gaseous epoxides from a sample gas stream, comprising:

contacting a sample gas stream containing gaseous epoxides with a first side of a selectively permeable and superacidic ionomeric barrier;

allowing gaseous epoxides in the sample to be converted within the barrier to non-epoxide products, said barrier being selectively permeable to said gaseous epoxides and non-epoxide products and impermeable to non-polar gases; and removing non-epoxide products from a second side of the barrier.

9. The method of claim 8, wherein the as stream is contacted with a perfluorinated alkyl sulfonic acid polymer barrier.

10. The method of claim 9, wherein tin the removing step, the non-epoxide products are caused to exit the barrier by continuous flow methods.

11. The method of claim 10, wherein the continuous flow methods are selected from the group consisting of pressure flow, vacuum flow, purge flow, and recirculating flow methods, and combinations thereof.

12. The method of claim 11, wherein, in the contacting step, the perfluorinated alkyl sulfonic acid polymer contains a repeating unit represented by the general formula selected from the group consisting of

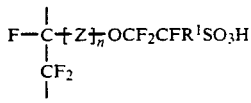

and

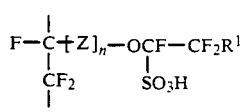

and mixtures thereof wherein n is 0, 1 or 2, $R^1$ is —F or perfluoroalkyl of 1 to 10 carbons, Z is $(-O-CF_2-CF_2-)_m$; $-OCF_2CFY-$ or $-OCFYCF_2-$, where m is 1 to 9, and Y is —F or trifluoromethyl.

13. The method of claim 12, wherein the repeating unit is represented by the general formula:

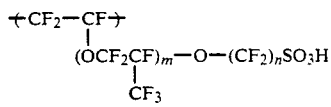

wherein m is 0 or 1 and n is 2 to 5.

14. A method of converting gaseous epoxides in a gas stream to non-epoxide products, comprising:

contacting the gaseous epoxides in the gas stream with a superacidic, selectively permeable ionomeric barrier and converting the gaseous epoxides within said ionomeric barrier and converting the gaseous epoxides within said ionomeric barrier to non-epoxide products, said barrier being selectively permeable to said non-epoxide products and impermeable to non-polar gases, said barrier being capable of converting at least 90 percent of the gaseous epoxides to non-epoxide products.

15. The method of claim 14, wherein the ionomeric barrier has a repeating unit represented by the formula selected from the group consisting of

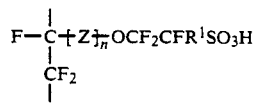

and

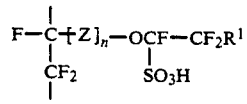

and mixtures thereof wherein n is 0, 1 or 2, $R^1$ is —F or perfluoroalkyl of 1 to 10 carbons, Z is $(-O-CF_2-CF_2-)_m$; $-OCF_2CFY-$ or $-OCFYCF_2-$, where m is 1 to 9, and Y is —F or trifluoromethyl.

16. The method of claim 14, further comprising removing permeable non-epoxide products formed during the contacting step using continuous flow methods.

17. The method of claim 14, wherein the perfluorinated alkyl sulfonic acid polymer contains a repeating unit represented by the general formula

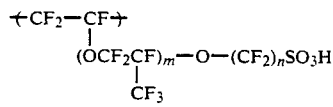

wherein m is 0 or 1 and n is 2 to 5.

18. A method for removing gaseous epoxides from a gas sample, comprising:

(a) contacting a first surface of a selectively permeable, ionomeric barrier with a gas sample containing gaseous epoxides;

(b) allowing the gaseous epoxides to permeate the barrier;

(c) converting about 90% of said gaseous epoxides within the barrier to non-epoxide products, said barrier being permeable to said non-epoxide products and impermeable to non-polar gases;

(d) applying epoxide-free purge gas to a second surface of the ionomeric barrier to remove non-epoxide products from the barrier.

19. The method of claim 18, wherein the step of contacting said barrier with the gas sample comprises contacting the barrier with a gas sample containing gaseous epoxides selected from the group consisting of ethylene oxide and propylene oxide.

20. The method of claim 19, further comprising obtaining the gas sample from effluent of a chemical sterilizer prior to contacting said sample with said barrier.

* * * * *